Oct. 25, 1966 N. L. MUENCH 3,280,923
NUCLEAR POWERED DRILLING METHOD AND SYSTEM
Filed Sept. 21, 1962 5 Sheets-Sheet 4

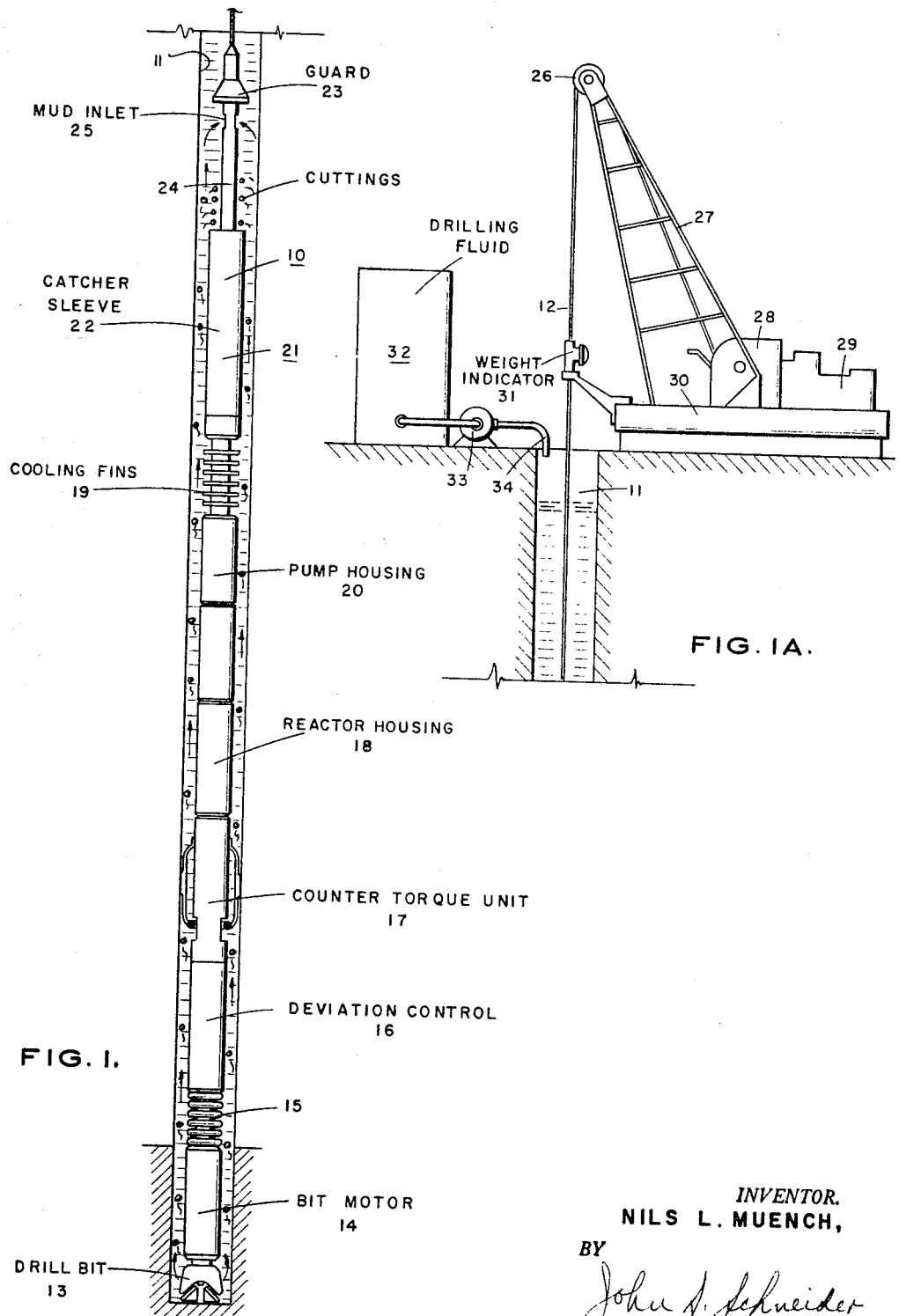

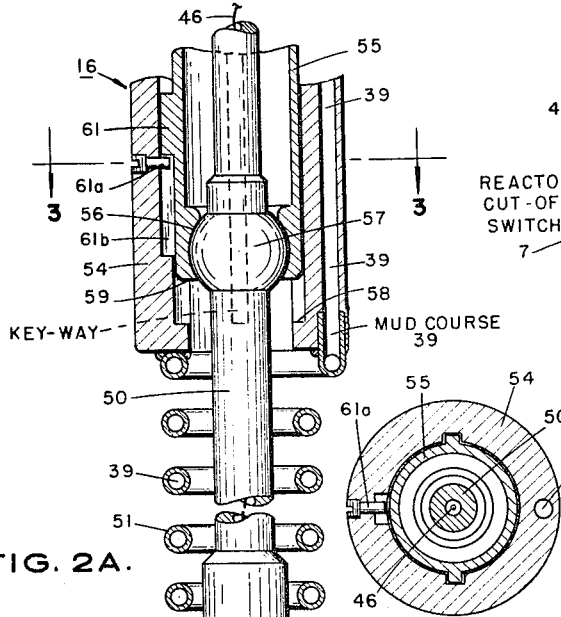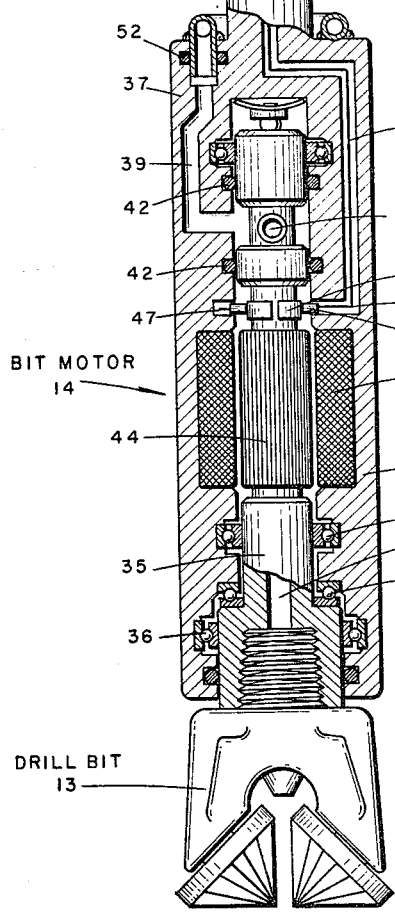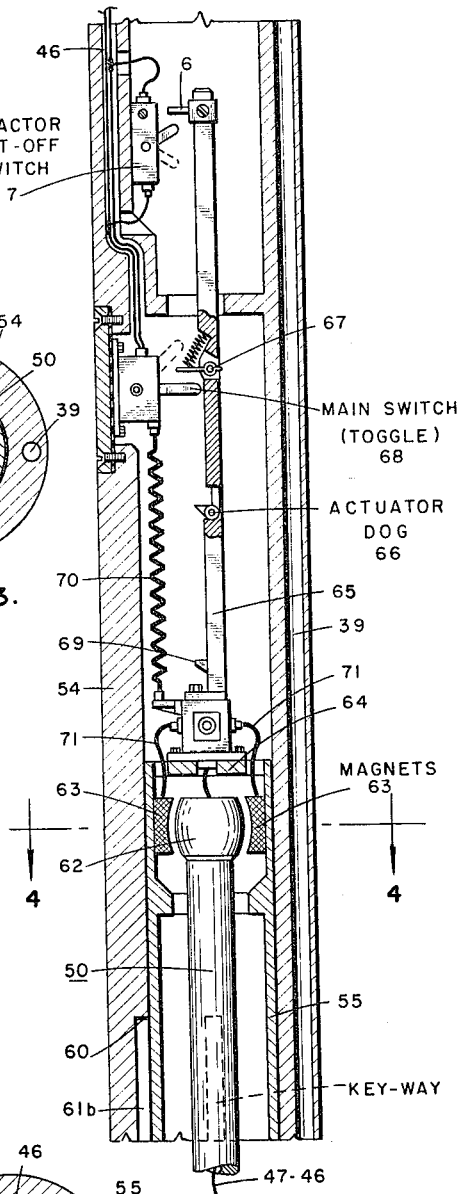

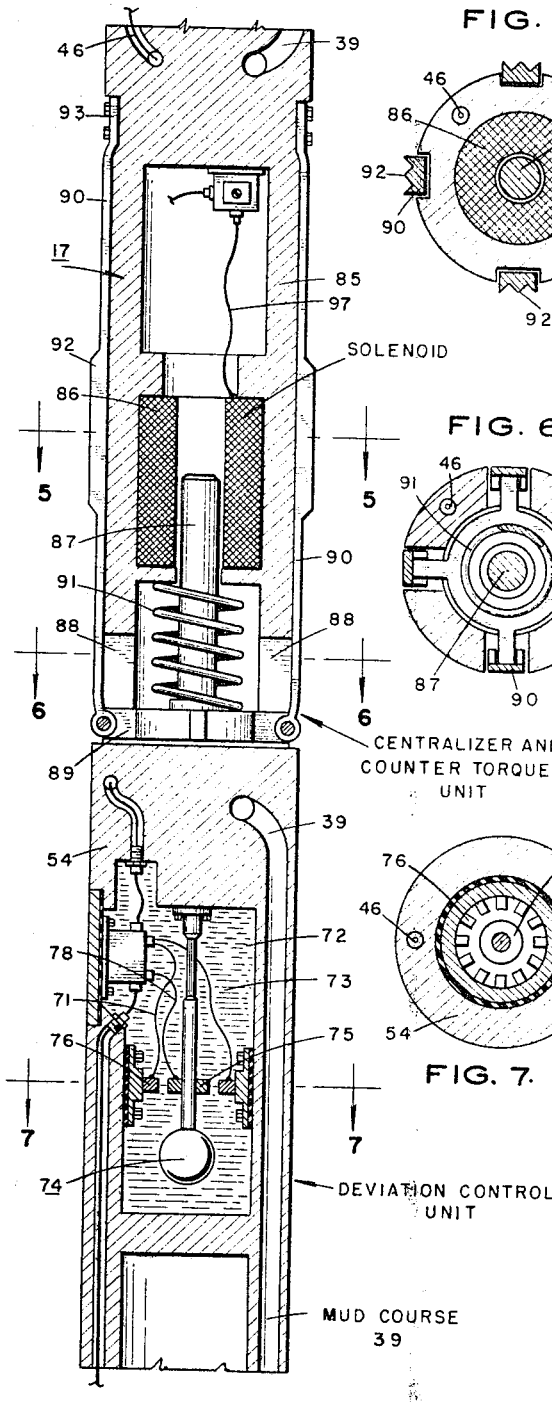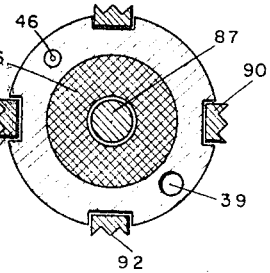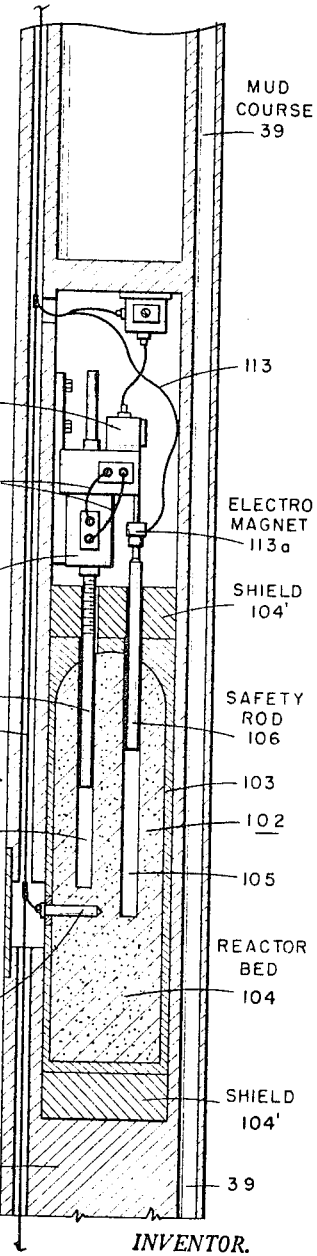

INVENTOR.
NILS L. MUENCH,
BY
John S. Schneider
ATTORNEY

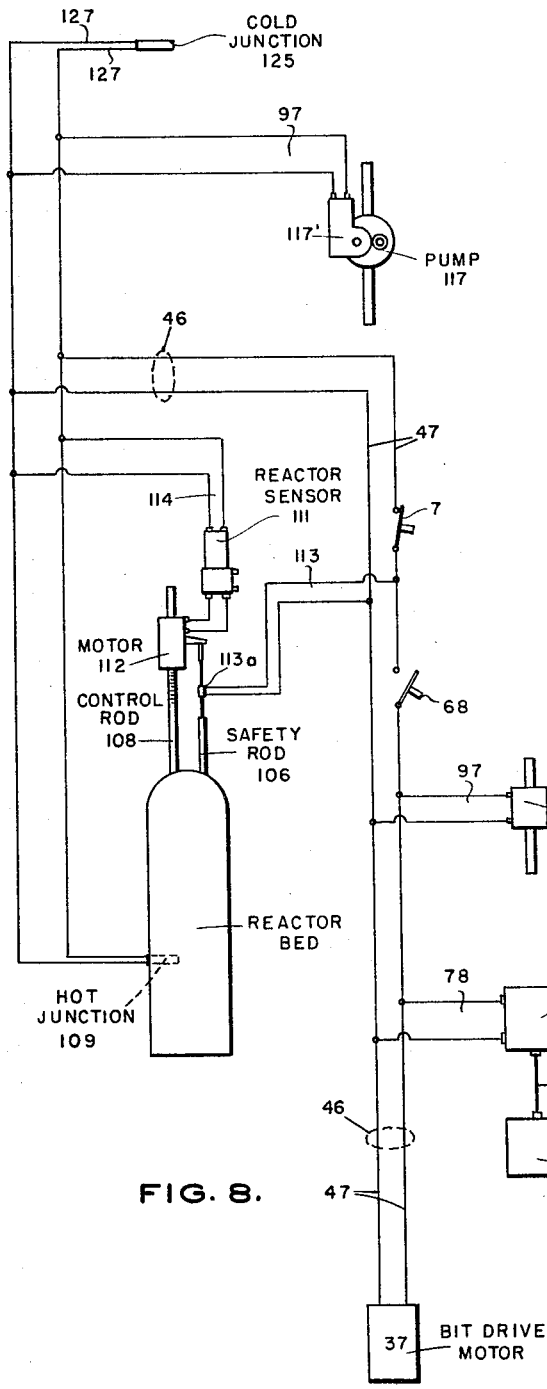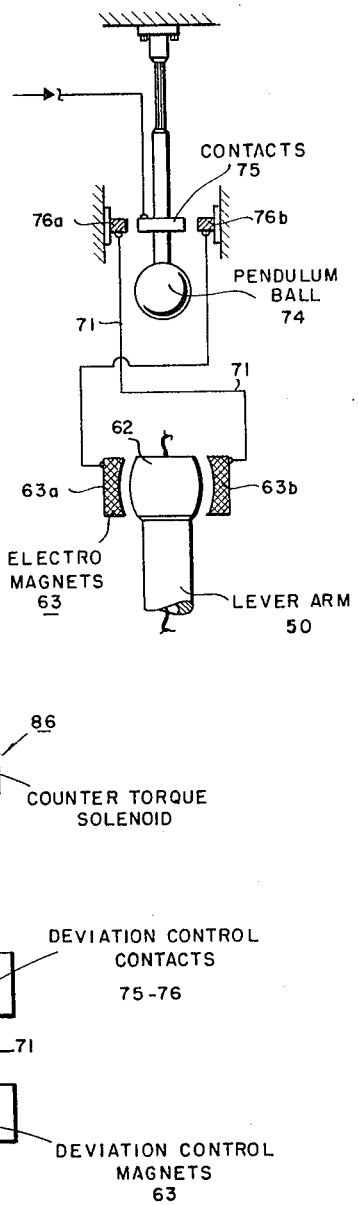

2

United States Patent Office 3,280,923
Patented Oct. 25, 1966

1

3,280,923
NUCLEAR POWERED DRILLING METHOD AND SYSTEM
Nils L. Muench, Washington, D.C., assignor, by mesne assignments, to Esso Production Research Company, Houston, Tex., a corporation of Delaware
Filed Sept. 21, 1962, Ser. No. 225,288
8 Claims. (Cl. 175—26)

The present invention relates to a nuclear powered drilling operation and equipment for use therewith.

The entire drilling system is suspendible on a nonconductor type cable, which eliminates need for the heavy drill string and permits use of a small, inexpensive drilling rig. No rotary table is needed in this drilling system, and it generates its own power down-hole for operating the drill bit, for circulating fluid for drilling, and for other operations to be described later in more detail. At the surface, only a small pump is required to adjust the drilling fluid density and to add mud to the well bore as drilling progresses. High speed round trips to change bits are possible since the only limitation is the horsepower used to operate the cable drum. Finally, because of the simplicity of the surface equipment, only a small operating crew is needed.

The invention encompasses a method for drilling boreholes with a drilling unit containing a drill bit and nuclear power for actuating the drill bit, the steps of which comprise suspending the drilling unit in a borehole on a cable or wire rope; and then actuating said drill bit to drill said borehole deeper while circulating fluid through said drill bit and collect cuttings therefrom in said borehole.

The apparatus of the invention briefly described comprises the following elements arranged together so as to make a unitary self-contained down-hole drilling system: a rotary drill bit; an electrical motor for driving said drill bit; means including a nuclear reactor and thermoelectric means for generating electrical power for operating the motor and other power-consuming components in the system; means for collecting cuttings from circulating drilling fluid; a pump for circulating said drilling fluid; an electrical motor for driving said pump; deviation control means for maintaining direction of drilling; countertorque and centralizing means for offsetting the torque created by said rotating drill bit and maintaining said unit centralized; and switch means for controlling the operation of the drill bit motor and the deviation control means and the countertorque and centralizer means.

A primary object of the present invention is to provide a new, improved, economical drilling technique and apparatus therefor.

This and other objects and advantages of the invention will be apparent from the following description thereof taken with the drawings wherein:

FIGS. 1 and 1A are schematic views illustrating the apparatus of the invention suspended in a bore-hole and the surface equipment used to carry out drilling operations;

FIGS. 2A to 2G are sectional views, partly in elevation showing in greater detail the apparatus of FIG. 1A from bottom to top, respectively;

Figure 2E:
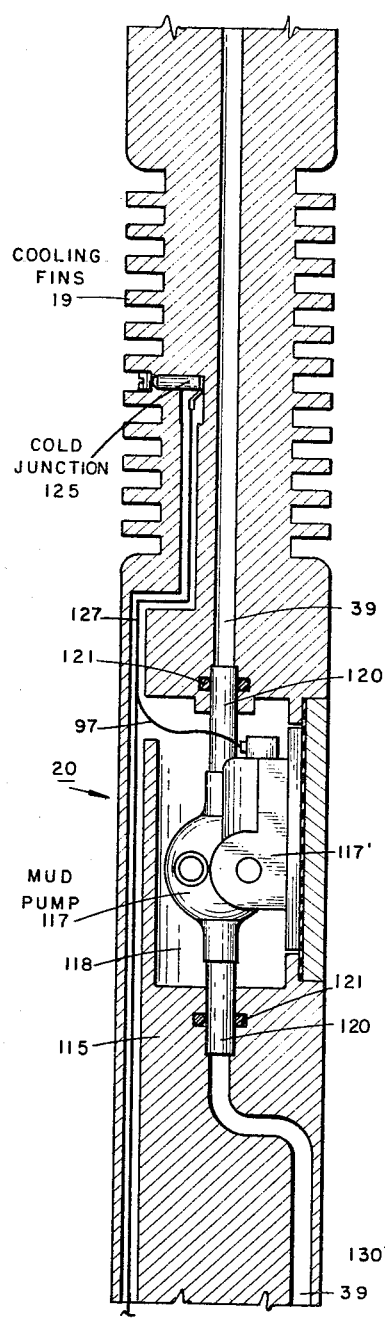

FIG. 3 is a view taken along lines 3—3 of FIG. 2A;
FIG. 4 is a view taken along lines 4—4 of FIG. 2B;
FIG. 5 is a view taken along lines 5—5 of FIG. 2C;
FIG. 6 is a view taken along lines 6—6 of FIG. 2C;
FIG. 7 is a view taken along lines 7—7 of FIG. 2C;
FIG. 8 is a schematic view of the electrical circuit incorporated in the apparatus; and
FIG. 9 is a schematic view of the electrical circuit for the deviation correction means components of the apparatus.

In FIG. 1 drilling apparatus generally designated 10 is shown suspended on a wire rope or cable 12 in a borehole 11 being drilled. Apparatus 10 includes, from bottom to top, a drill bit 13; an electrical motor 14 for driving drill bit 13; a spring thrust member 15; a deviation control section 16; a countertorque and centralizer section 17; a nuclear reactor power section 18, which together with cooling fins section 19 located above a pump section 20 generates electrical power for operating the system; and a cuttings collector section 21, which includes a catcher sleeve 22 and a sleeve guard 23. A hollow pipe 24, which extends downwardly into catcher sleeve 22, is provided with openings 25 at its upper end for circulation of drilling fluid or mud in the direction indicated by the arrows. As seen in FIG. 1A, cable 12 extends to the surface of the earth, where it winds over a pulley 26 mounted on a light rig 27 and around a drum 28 driven by a prime mover 29, all mounted on a drilling platform 30. A weight indicator 31 supported on platform 30 is operably connected to cable 12. A reservoir of drilling mud 32 has connected to it a pump 33 and a conduit 34 for supplying drilling mud to borehole 11.

As seen in FIG. 2A, drill bit 13 is threadedly connected to a rotatable drive shaft 35 mounted in bearing 36 in motor housing 37. A central opening in shaft 35 forms part of a continuous flow path 39 for circulating drilling mud. Flow path 39 extends through an inlet 41 and a passageway formed in housing 37. Seals 42 prevent leakage of drilling mud within housing 37. An armature 44 of a D.C. electrical motor is formed on shaft 35 adjacent electromagnets 45 arranged in housing 37. A cable 46 carries electrical conductors 47, which supply D.C. voltage to electromagnets 45 and to brushes 40, which contact a slip ring 48 arranged on shaft 35. Cable 46 extends through housing 37, as shown, and through other components of the system, as will be seen. The various leads contained in cable 46 are shown in FIG. 8, and the various electrical connections will be described in detail in a later discussion of the circuit shown in that figure.

The upper end of housing 37 is attached to a pivotal lever arm 50, which extends upwardly into deviation control section 16 and forms an articulated joint between motor 14 and deviation control section 16. An essentially constant thrust spring 51 surrounds arm 50 between housing 37 and deviation control section 16 to maintain thrust on bit 13 at all times. As shown, spring 51 is welded at its contact ends to section 16 and housing 37. Spring 51 is formed hollow to provide a continuation of flow path 39. A seal 52 is located in housing 37 to maintain flow path 39 isolated. Flow path 39 continues through an opening formed in a housing 54 of deviation control section 16. A cage 55 slidably mounted in housing 54 is provided adjacent its lower end with a curved pivot surface 56 in which a ball-shaped portion 57 of arm 50 is pivotally fitted. An inner shoulder 58 of housing 54 forms a lower stop for cage 55 when the lower end 59 of cage 55 engages it. An upper shoulder 60 formed on the interior of housing 54, as seen in FIG. 2B, forms an upper stop for cage 55 when another outer shoulder 61 formed on it engages shoulder 60. Although shoulder 58 limits the extreme downward movement of cage 55, the cage is held in the position shown in FIG. 2A by shear pin 61a engaged by shoulder or lug 61. Lug 61 is movable vertically in a key way 61b, which is limited by upper shoulder 60 in housing 54. Shoulder or lug 61 also prevents rotational movement between cage 55 and housing 54. Another purpose of the shear pin 61a and lug 61 will be described later herein. As shown in FIG. 3, the device may incorporate additional keys and key ways between the housing and the cage. The upper end of arm 50 terminates in a rounded part 62 adjacent a plurality of circumferentially spaced electromagnets 63 (see FIG. 4) arranged on the inner wall of cage 55. Above the electromagnets, cage 55 forms a partition 64 on which is mounted a switch control rod 65, which is provided with a spring-biased actuator dog 66 and a spring-biased dog 67 designed to move up and down a main toggle switch 68 connected to the inner wall of housing 54. As a substitute for actuator dog 66, a lower dog 69 may be used or dog 66 may be made adjustable along the length of rod 65. A coiled, flexible stretchable conductor 70 carries leads 47 from the hollow interior of arm 50 to main switch 68 and also leads 71 from magnets 63 to main switch 68. An actuator dog 6 is also mounted on rod 65 and is adapted to engage switch 7 when shear pin 61a is broken and cage 55 is allowed to engage shoulder 58.

Referring to FIG. 2C and FIGS. 5, 6, and 7, the upper end of housing 54 is provided with an isolated reservoir chamber 72 in which is located a viscous fluid 73 and a pendulum 74 suspended from the upper wall to which is attached a circular contact 75, as seen more particularly in FIG. 7. Mounted on the side wall of the reservoir are a plurality of circumferentially spaced contacts 76. Electrical leads 71 connect magnets 63 to contacts 76, and leads 78 connect contact 75 and the electrical source, as will be described later herein.

Mounted on housing 54 is the countertorque and centralizer section 17, which is composed of a hollow housing 85 in which is arranged electromagnet coils 86, through which a movable metallic core 87 extends. The lower end of housing 85 is provided with spaced-apart slots 88 (see also FIG. 6) in which ride collar members 89 to which are attached the lower ends of centralizer bow spring members 90. A spring 91 surrounding core 87 biases the collar members downwardly. The center portion of bow spring members 90 are serrated as at 92 (see also FIG. 5). The upper ends of members 90 are secured and fixed to housing 85, as at 93. Passageway 39 in housing 54 is deviated, as shown, to extend through the thicker wall section of portion 85. Also, as seen in these figures, electrical cable 46 feeds through housing 85 through an opening formed therein.

Arranged on housing 85 is another housing 100 through which is formed a continuation of flow path 39 and in which is arranged a nuclear reactor mechanism 102. In a reactor 103 in housing 100 is located a mass of fissionable material 104 arranged between upper and lower radiation shields 104' and formed with a recess 105 in which is movable a safety rod 106 and a recess 107 in which is movable a control rod 108. A stationary bimetallic hot junction thermocouple 109 also is arranged in mass 104. The fissionable material may be uranium 235, uranium 233, polonium 239, etc. The shape of the mass of fissionable material 104 may be spherical or any other desired shape such as the generally cylindrical shape shown in FIG. 2D. Electrical leads 110 connect a reactor control sensor 111 to an electrical motor 112 used to move control rod 108 upwardly and downwardly to control the fission reaction of the material 104. A lead 113 connects to an electromagnet 113a, which when energized supports safety rod 106 as shown. Electrical current is supplied to electromagnet 113a through switch 7 of FIG. 2B. When it is desired to deactivate the reactor, tool 10 is quickly raised by line 12 so as to shear pin 61a and allow cage 55 to engage shoulder 58. Such movement between the housing 54 and the cage 55 allows dog 6 to engage and open switch 7, de-energizing magnet 113a and dropping safety rod 106 into the reactor bed 104.

Pump section 20 is arranged above power section 18, and it includes a housing 115 in which is provided an opening, which forms an extension of flow passageway 39. A fluid pump 117 driven by an electrical motor 117' is arranged in a chamber 118 formed in housing 115, and it pumps fluid downwardly through flow passageway 39 from another opening which feeds circulating fluids to pump 117. Conduits 120 leading to and from pump 117 from and to passageway 39 are provided with seals 121 to prevent leakage of the circulating fluid. Electrical cable 46 extends upwardly through housing 115. Leads 127 connect a bimetallic cold junction thermocouple 125 mounted in cooling fins 19 positioned above housing 115 to hot junction 109. Cooling fins 19 provide better heat transfer from said cold junction through the drilling fluid into the earth formation which serves as a heat sink. Although only one hot and one cold junction have been described and shown, a multiplicity of each are necessary to generate a sufficient amount of electrical energy to operate the various components of the device. A more detailed account of the thermoelectric effect to be used is found in "Thermoelectricity: Science and Engineering" by Robert R. Heikes and Roland W. Ure, Jr., Westinghouse Research Laboratories, Pittsburgh, Pennsylvania, Interscience Publishers: New York-London, 1961.

Cuttings collector section 21 is arranged above cooling fins 19. Catcher sleeve 22 is provided with a door 128 to aid in the removal of collected cuttings. Passageway 39 continues upwardly through cooling fins 19 and fluidly communicates with ports 25 in pipe 24. Collector sleeve 22 is sealingly mounted on the upper end of housing 115 by means of seals 129 and releasable latch members 130.

The over-all electrical circuit for operating the various components is illustrated schematically in FIG. 8, and the electrical circuit for the deviation control elements themselves is schematically shown in FIG. 9. As seen in FIG. 8, pump 117 and sensor device 111 are connected in parallel to the thermocouple leads 127 through leads 97 and 114, respectively. Bit motor 37 also is coupled to leads 127 through toggle switch 68 connected to leads 47. Control switches 75–76 and countertorque electromagnet 86 connect in parallel to leads 47 through leads 78 and 97, respectively, as shown.

In FIG. 9 the current generated in leads 127 travels through leads 47 and 78 to switch contact 75. Closing of the circuit when contact 75 engages one of the contacts, e.g., 76a, causes current to flow through leads 71 to an electromagnet 63b opposite to the circumferential position of contact 76a. Similarly, movement of contact 75 to the other contact 76b energizes electromagnet 63a.

The operation of the device now will be described. As seen in FIGS. 1 and 1A, the drilling apparatus 10 is suspended in borehole 11 on cable 12, which is supported by and operated from surface platform equipment 26 to 30. Weight indicator 31, which is a live line indicator, can be used to provide indications of the tension or slack in cable 12. Pump 33 may be operated to pump drilling fluid from container or reservoir 32 into the borehole when it is needed through conduit 34.

When it is desired to drill, cable 12 is slacked off, which causes cage 55 (see FIGS. 2A and 2B) to move upward relative to housing 54 or, otherwise stated, this movement of cage 55 moves rod 65 upwardly and causes actuator dog 66 (or 69) to engage and close switch 68.

Electric current is generated by the thermoelectric effect; that is, generation of an electrical potential by placing two dissimilar metals in contact with one another. Thermoelectric metal alloys that might be used are bismuth telluride and bismuth selenide. To obtain the positive conductivity type, these materials may be doped with lead or bismuth and to obtain the negative conductivity type, these materials may be doped with copper or silver halide. For example, a negative conductivity type is bismuth telluride doped with copper iodide and a positive conductivity type is bismuth telluride doped with bismuth. Additional examples of materials that can be used may be found in Thermoelectricity by Paul H. Egli, U.S. Naval Research Laboratory, Washington, D.C., published by John Wiley & Sons, 1960. Nuclear reactor 103, which is controlled by operation of motor 112 and control rod 108, is used to generate heat for the hot junction 109 inserted in the fissionable material 104. Details of the reactor have not been shown; however, control mechanism for controlling actuation of the solenoids and of the control units which are adaptable for use with this invention may be found in "Control of Nuclear Reactors," Proceedings, Institute of Electrical Engineering, 103-577 (1956) by R. J. Cox and Jay Walker or "Control and Instruments of Nuclear Reactors," Proceedings, Institute of Electrical Engineering, 103-564 (1956) by A. B. Gillespie.

The electrical energy generated is used to operate pump 117, which operates continuously and pumps or circulates drilling mud downwardly through flow passageway 39 and the openings in bit 13, up the annulus surrounding the apparatus, and then into inlet openings 25, as shown in FIG. 1.

Figure 2F:
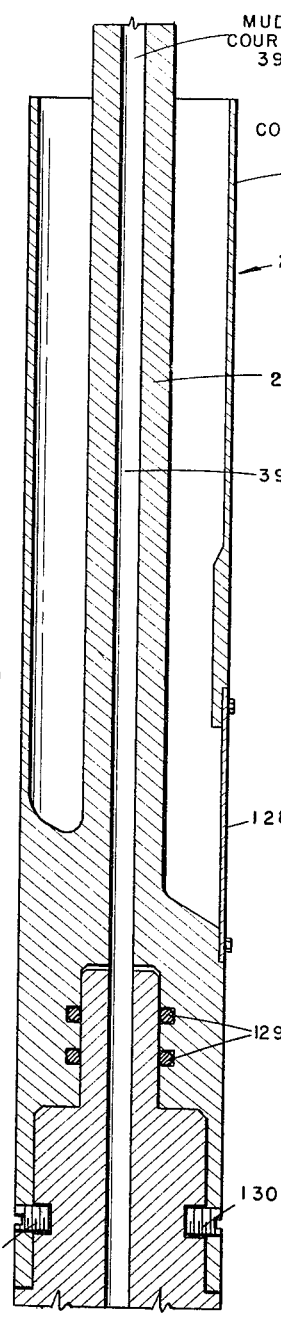
Figure 2G:
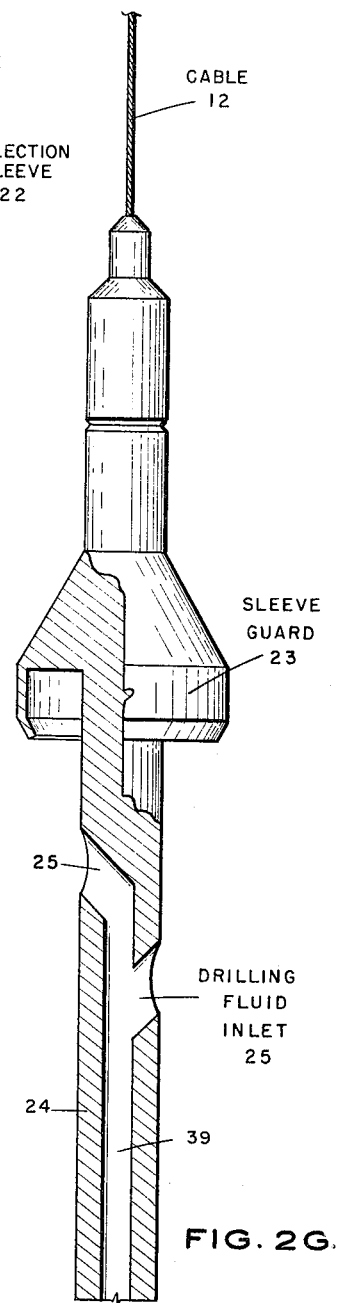

As illustrated in this figure and also in FIGS. 2F and 2G, the cuttings are carried upwardly with the circulating drilling fluid and fall downwardly into collector sleeve 22, where the cuttings deposit. When collection sleeve 22 has filled, the apparatus is raised to the surface and cuttings door 128 is removed, and the cuttings discharged from sleeve 22. Collection sleeve 22 is readily disconnected from housing 115 by latch members 130.

Closing switch 68 supplies energy to the bit motor for operating drill bit 13. Deviation of the bit is controlled by lever shaft 50. Thus, if, bit 13 veers to the left and causes housing 54 to incline at an angle to the vertical right hand contact 76 abuts contact 75 which causes electrical energy to be transmitted to a left hand electromagnet 63 and pivots the upper end 62 of shaft 50 to this electromagnet on pivot point 57. The lower end of shaft 50 below the pivot point connected to bit motor and drill bit 13 pivots to the right. Shaft 50 is held in this position until housing 54 is again in a vertical position. In this position, contacts 76 and 75 are disengaged and the upper end of shaft 50 is released from its attraction to the electromagnet 63. Shaft 50 is again centered in housing 54 and drill bit 13 is again directed vertically.

Also, the centralizer and countertorque mechanism is made operative. Thus, solenoid 86 is activated through leads 97, which pulls core 87 upwardly against the bias of spring 91, which in turn carries collars 89 upwardly, thereby moving the lower end of bow springs 90 upwardly, forcing them to bow out and contact the walls of the borehole with their serrated edges 92 to centralize and inhibit or prevent rotation of the apparatus above the drill bit. The serrations 92 are formed so as to prevent rotational movement of the upper sections of the device and still allow vertical movement downwardly of the entire assembly when drilling.

Once it is desired to halt drilling, the cable 12 is pulled up, which causes housing 54 to move up relative to cage 55 and control rod 65. Relative movement of control rod 65 downwardly causes dog 67 to contact toggle switch 68 and move it downwardly to turn off the supply of current to the bit motor, the deviation control apparatus, and the countertorque apparatus.

In the preceding description of the invention, electrical energy was used to operate the various components of the drilling system to illustrate the preferred manner of operation. However, the invention is not limited to this mode of operation for the electrical energy may be converted to hydraulic energy, and the hydraulic energy used to operate one or more components of the drilling system. Also, instead of using electrical energy to drive the drill bit, it is within the scope of the invention to drive it with a turbine steam engine or a steam percussion device. The steam to operate the steam engine or percussion device would be generated by the heat of the nuclear reaction. Other modifications in the apparatus are within the purview of the invention. Such modifications include the use of extendable, retractable dogs as centralizer and countertorque means in place of, or together with, the serrated bow springs used to perform these functions in the above description of the invention. The dogs would be driven into the formation surrounding the borehole by any desired means, such as a solenoid operated wedge member to lock the apparatus in the borehole. Drilling would proceed with the essentially constant thrust member spring applying weight to the bit. Then, when the hole had been deepened and the spring had expanded, the dogs would be retracted, the apparatus lowered, and the procedure repeated in a semi-continuous type drilling operation.

Having fully described the objects, advantages, method, and apparatus of my invention, I claim:

1. A drilling apparatus capable of drilling a borehole and of being suspended on a nonconductor-type cable in said borehole comprising:
   a drill member adapted to drill said borehole when actuated;
   electrically operated motor means connected to said drill member for actuating said drill member;
   a nuclear reactor adapted to generate heat;
   thermoelectric means coupled to said nuclear reactor for generating electrical power;
   means adapted to collect cuttings from said drilling fluid arranged near the upper end of said apparatus;
   a longitudinally extending fluid passageway arranged in said apparatus for circulating drilling fluid therethrough;
   a pump arranged in said fluid passageway adapted to circulate drilling fluid down said fluid passageway and up the annulus between said apparatus and said borehole wall when said apparatus is in operation in a borehole;
   deviation control means connected to said drill member adapted to return said drill member to a vertical direction of drilling when said drill member deviates therefrom;
   centralizing means capable of extending from said apparatus adapted to maintain said apparatus centralized in said borehole;
   means adapted to conduct said electrical power to said motor means for operating said motor means; and
   means adapted to actuate operation of said motor means in response to a preselected weight on said drill member.

2. Apparatus as recited in claim 1 including a rotatable drill member, said centralizer means including means capable of engaging said borehole wall to prevent rotation of said apparatus above said drill member when said drill member rotates.

3. A drilling apparatus capable of drilling a borehole and of being suspended on a nonconductor-type cable in said borehole comprising:
   a drill member adapted to drill said borehole when actuated;
   an electric motor connected to said drill member adapted to actuate said drill member;
   sleeve means adapted to collect cuttings from said drilling fluid arranged near the upper end of said apparatus;
   a vertically extending fluid passageway arranged in said apparatus for circulating drilling fluid therethrough;
   a pump arranged in said fluid passageway adapted to circulate drilling fluid down said fluid passageway and up the annulus between said apparatus and said borehole wall;
   an electric motor connected to said pump adapted to drive said pump;
   a nuclear reactor adapted to generate heat;
   thermoelectric means coupled to said nuclear reactor for generating electrical power;
   means capable of conducting said electrical power to said drill and pump motors to operate said motors;
   deviation control means connected to said drill member adapted to return said drill member to a vertical direction of drilling when it deviates therefrom;
   centralizing means capable of extending from said apparatus adapted to maintain said apparatus centralized in said borehole; and switch means adapted to operate said drill member motor in response to a preselected amount of weight on said drill member.

4. Apparatus as recited in claim 3 including a rotatable drill member, said centralizer means including means arranged on said apparatus capable of engaging said borehole wall to prevent rotation of said apparatus above said drill member when said drill member rotates.

5. A drilling apparatus capable of drilling a borehole and of being suspended on a nonconductor cable in said borehole comprising:

a drill member adapted to drill said borehole when actuated;

an electric motor connected to said drill member adapted to actuate said drill member;

means coupled to said electric motor adapted to generate electrical energy to operate said electric motor comprising a nuclear reactor for generating heat, a hot junction comprising dissimilar metals located in said reactor, a cold junction comprising dissimilar metals separated from said hot junction, electrical conductors connecting said hot and cold junctions; and cooling means provided adjacent said cold junction to facilitate heat transfer from said cold junction through the drilling fluid surrounding said apparatus into the earth formation which serves as a heat sink.

6. Apparatus as recited in claim 5 including a rotatable drill member, said apparatus including means capable of engaging said borehole wall to prevent rotation of said apparatus above said drill member when said drill member rotates.

7. A drilling apparatus capable of drilling a borehole and of being suspended on a nonconductor-type cable in said borehole comprising:

a drill member adapted to drill said borehole when actuated;

electrical motor means connected to said drill member adapted to actuate said drill member;

nuclear power means arranged on said apparatus adapted to provide electrical energy;

a pivotal shaft connected to said motor means and said drill member;

a housing surrounding an upper portion of said pivotal shaft and longitudinally movable relative thereto;

a flexible compression spring arranged between the lower end of said housing and said motor means and surrounding the shaft adapted to exert an essentially constant thrust on said drill member;

a cage arranged about and pivotally connected to said shaft;

a plurality of circumferentially spaced electromagnets positioned in said cage adjacent the upper end of said shaft;

said housing being provided with a closed chamber;

a pendulum suspended in said closed chamber;

a first electrical contact mounted on said pendulum;

a plurality of circumferentially spaced second electrical contacts positioned within said closed chamber adjacent said first contact and longitudinally aligned with said electromagnets in said cage;

electrical conductors connecting each of said second electrical contacts with one of said electromagnets positioned circumferentially opposite thereto;

the electrical energy provided by said nuclear power means being connected to said first contact whereby when inclination of said housing from its normally substantially vertical position causes one of said second contacts to engage said first contact on said pendulum and thereby activate an electromagnet positioned circumferentially opposite to said engaged second contact and adjacent said shaft above its pivot point, said electromagnet attracts and causes the upper end of said shaft to move toward said electromagnet which pivots said shaft and moves its lower end and said drill member attached thereto in a lateral direction opposite to the direction of lateral movement of the upper end of said shaft;

a plurality of circumferentially spaced-apart, extensible, bow spring members, each provided with a serrated outer surface arranged on said housing adapted to engage the wall of said well bore when extended to centralize and prevent rotation of said apparatus above said drill member;

motor means operated by said electrical energy connected to said bow spring members adapted to extend them;

a switch attached to said housing adapted to operate said drill member motor means and said motor means for extending said bow spring members; and a switch actuator rod connected to said cage adapted to control actuation of said switch upon longitudinal movement of said housing relative to said rod.

8. Apparatus as recited in claim 7 including a rotatable drill member.

References Cited by the Examiner

UNITED STATES PATENTS

| | | | |
|---|---|---|---|
| 694,534 | 4/1902 | Davis | 175—57 |
| 1,283,542 | 11/1918 | Murphy et al. | 175—104 |
| 1,430,473 | 9/1922 | Stoll | 175—98 |
| 2,531,120 | 11/1950 | Feaster | 175—104 |
| 2,637,527 | 5/1953 | Andrews | 175—104 X |
| 2,643,087 | 6/1953 | Ogorzaly et al. | 175—104 X |
| 2,984,310 | 5/1961 | Meier | 175—104 X |
| 3,008,890 | 11/1961 | Bartnoff | 310—3 X |
| 3,028,921 | 4/1962 | LeBus | 175—57 |
| 3,049,709 | 8/1962 | Rianhard | 310—3 X |
| 3,057,340 | 10/1962 | Fritts | 136—4 X |

FOREIGN PATENTS 867,025  5/1961  Great Britain.

OTHER REFERENCES

Linden, D. et al: "New Power Source for Space Age Electronics" in Electronics, vol. 32, No. 12. March 20, 1959, pp. 43–47.

CHARLES E. O'CONNELL, Primary Examiner.

I. A. CALVERT, D. H. BROWN, Assistant Examiners.